United States Patent
Kamijo et al.

(10) Patent No.: US 9,197,761 B2
(45) Date of Patent: Nov. 24, 2015

(54) SPECTRAL CHARACTERISTIC ACQUISITION APPARATUS, IMAGE EVALUATION APPARATUS, AND IMAGE FORMING APPARATUS

(71) Applicants: Naohiro Kamijo, Kanagawa (JP); Kohei Shimbo, Kanagawa (JP); Yoichi Kubota, Tokyo (JP)

(72) Inventors: Naohiro Kamijo, Kanagawa (JP); Kohei Shimbo, Kanagawa (JP); Yoichi Kubota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/454,847

(22) Filed: Aug. 8, 2014

(65) Prior Publication Data
US 2015/0049371 A1 Feb. 19, 2015

(30) Foreign Application Priority Data
Aug. 15, 2013 (JP) ................. 2013-168981

(51) Int. Cl.
H04N 1/46 (2006.01)
H04N 1/00 (2006.01)
H04N 1/50 (2006.01)
H04N 1/60 (2006.01)
G01J 3/28 (2006.01)
G01J 3/18 (2006.01)

(52) U.S. Cl.
CPC ....... H04N 1/00015 (2013.01); H04N 1/00005 (2013.01); H04N 1/00023 (2013.01); H04N 1/50 (2013.01)

(58) Field of Classification Search
CPC .......... H04N 1/00015; H04N 1/00005; H04N 1/00023; H04N 1/50

USPC .................. 358/504, 1.9; 356/326, 328, 334
See application file for complete search history.

(56) References Cited

U.S. PATENT DOCUMENTS 5,933,520 A 8/1999 Ishimoto et al.
6,975,949 B2 12/2005 Mestha et al.
(Continued)

FOREIGN PATENT DOCUMENTS

EP 0301506 2/1989
JP 2002-310799 10/2002
(Continued)

OTHER PUBLICATIONS

Yoichi Miyake, "Analysis and Evaluation of Digital Color Images", vol. 10, University of Tokyo Press, Feb. 25, 2000, pp. 154-157.
U.S. Appl. No. 14/272,705, filed May 8, 2014.
Extended European Search Report dated Aug. 6, 2015.

Primary Examiner — Barbara Reinier
Assistant Examiner — Henok A Shiferaw
(74) Attorney, Agent, or Firm — IPUSA, PLLC

(57) ABSTRACT

A spectral characteristic acquisition apparatus includes a light emitting part configured to emit light onto an object, a light dividing part configured to divide the light reflected from the object into multiple light beams by multiple aperture parts of the light dividing part, a dispersing part configured to form multiple diffraction images corresponding to the aperture parts by spectrally dispersing the light beams, a light receiving part including an array of spectral sensors that receive the diffraction images at substantially the same position on their respective light receiving surfaces and convert the received diffraction images into electrical signals, and an operation part configured to compute a spectral characteristic of the object based on the electrical signals.

5 Claims, 10 Drawing Sheets

(56) References Cited

U.S. PATENT DOCUMENTS

| | | |
|---|---|---|
| 7,057,723 B2 | 6/2006 | Klock et al. |
| 7,671,992 B2 | 3/2010 | Ehbets et al. |
| 8,497,988 B2 | 7/2013 | Shimbo et al. |
| 8,559,005 B2 | 10/2013 | Shimbo et al. |
| 8,755,046 B2 | 6/2014 | Shimbo et al. |
| 2011/0063615 A1* | 3/2011 | Shimbo ............... G01J 3/02 356/326 |
| 2011/0299104 A1* | 12/2011 | Seo ..................... G01J 3/02 358/1.9 |
| 2012/0182373 A1* | 7/2012 | Hayashi ............... B41J 2/455 347/224 |
| 2013/0063723 A1 | 3/2013 | Shimbo et al. |
| 2013/0235376 A1 | 9/2013 | Kamijo et al. |

FOREIGN PATENT DOCUMENTS

| | | |
|---|---|---|
| JP | 2003-139702 | 5/2003 |
| JP | 3566334 | 9/2004 |
| JP | 2005-265752 | 9/2005 |
| JP | 2005-315883 | 11/2005 |
| JP | 2007-327923 | 12/2007 |
| JP | 2008-518218 | 5/2008 |
| JP | 2010-256324 | 11/2010 |
| JP | 2010-261861 | 11/2010 |
| WO | 02/50783 | 6/2002 |
| WO | 03/038383 | 5/2003 |

* cited by examiner

SPECTRAL CHARACTERISTIC ACQUISITION APPARATUS, IMAGE EVALUATION APPARATUS, AND IMAGE FORMING APPARATUS

CROSS-REFERENCE TO RELATED APPLICATION

The present application is based upon and claims the benefit of priority of Japanese Patent Application No. 2013-168981, filed on Aug. 15, 2013, the entire contents of which are incorporated herein by reference.

BACKGROUND OF THE INVENTION

1. Field of the Invention

The present invention relates to spectral characteristic acquisition apparatuses, image evaluation apparatuses, and image forming apparatuses.

2. Description of the Related Art

In production printing, it has become possible to provide printed materials in small lot size and in a short delivery time, using, for example, electrophotographic or inkjet printers. Printers used in such production printing are required to output images of as good quality as those output by conventional offset printers.

Some production printing printers measure colors of printed images and optimize image forming conditions based on measurement results in order to improve the color stability and color reproducibility of images. For example, Japanese National Publication of International Patent Application No. 2008-518218 has proposed a measurement apparatus for measuring colors of printed images in printers, where an array of photoelectric line sensors receives reflected light from an object of measurement such as a printed image and measures colors of the object of measurement.

SUMMARY OF THE INVENTION

According to an aspect of the present invention, a spectral characteristic acquisition apparatus includes a light emitting part configured to emit light onto an object, a light dividing part configured to divide the light reflected from the object into multiple light beams by multiple aperture parts of the light dividing part, a dispersing part configured to form multiple diffraction images corresponding to the aperture parts by spectrally dispersing the light beams, a light receiving part including an array of spectral sensors that receive the diffraction images at substantially the same position on their respective light receiving surfaces and convert the received diffraction images into electrical signals, and an operation part configured to compute a spectral characteristic of the object based on the electrical signals.

According to an aspect of the present invention, an image evaluation apparatus includes the spectral characteristic acquisition apparatus as set forth above and an image evaluation part configured to evaluate an image on the object based on the spectral characteristic of the object determined by the spectral characteristic acquisition apparatus.

According to an aspect of the present invention, an image forming apparatus includes an image forming part configured to form an image on an object and an image evaluation apparatus configured to evaluate the image on the object. The image evaluation apparatus includes the spectral characteristic acquisition apparatus as set forth above and an image evaluation part configured to evaluate the image on the object based on the spectral characteristic of the object determined by the spectral characteristic acquisition apparatus.

The object and advantages of the present invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
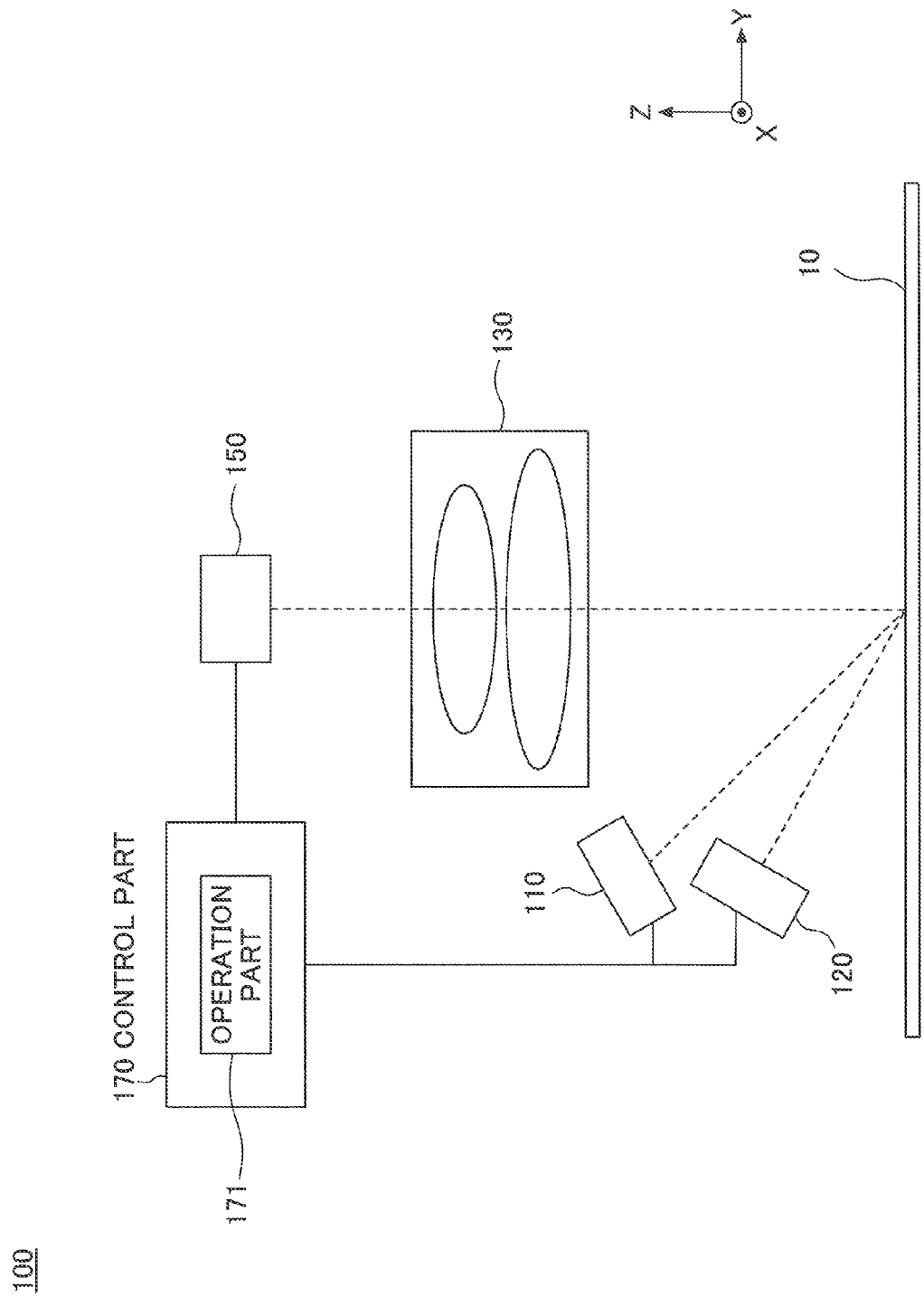
FIG. 1 is a schematic diagram illustrating a configuration of a spectral characteristic acquisition apparatus according to a first embodiment.

According to the above-described proposed measurement apparatus, however, if the position at which the reflected light is received in the photoelectric line sensor varies from photoelectric line sensor to photoelectric line sensor, the sensor output may differ among the photoelectric line sensors so that measurement results vary to decrease the measurement accuracy, even if the reflected light is from the same object of measurement.

According to an aspect of the present invention, a spectral characteristic acquisition apparatus reduces measurement variations in multiple spectral sensors and acquires spectral characteristic with high accuracy.

A description is given below, with reference to the accompanying drawings, of embodiments of the present invention. In the drawings, the same elements are referred to by the same reference numeral, and a repetitive description thereof may be omitted. In embodiments of the present invention, the spectral characteristic refers to the intensity of diffused reflected light expressed as a function of a wavelength, and includes spectral reflectance.

[First Embodiment]

FIG. 1 is a schematic diagram illustrating a configuration of a spectral characteristic acquisition apparatus 100 according to a first embodiment. In the drawings, a direction indicated by arrow X ("X direction") is a direction in which pixels are arranged in a line sensor, a direction indicated by arrow Y ("Y direction") is a direction perpendicular to the X direction in a light-receiving surface of the line sensor, and a direction indicated by arrow Z ("Z direction") is a direction perpendicular to the light-receiving surface of the line sensor.

Referring to FIG. 1, a spectral characteristic acquisition apparatus 100 includes a light source unit 110, an auxiliary light source unit 120, an imaging forming optical system 130, a spectral measurement unit 150, and a control part 170.

A description is given below of a case where the spectral characteristic acquisition apparatus 100 measures the spectral reflectance of an object 10. The object 10 is, for example, a sheet-shaped printed material, and an image is formed on a surface of the object 10.

The light source unit 110 is an example of a light emitting part, and emits light onto an area linearly extending in a widthwise direction of the object 10 (that is, the X direction). The light source unit 110 is, for example, a white light-emitting diode (LED) array. The light source unit 110 is not limited to white LEDs, and may alternatively be, for example, a fluorescent lamp such as a cold cathode tube, or a lamp light source.

Figure 2:
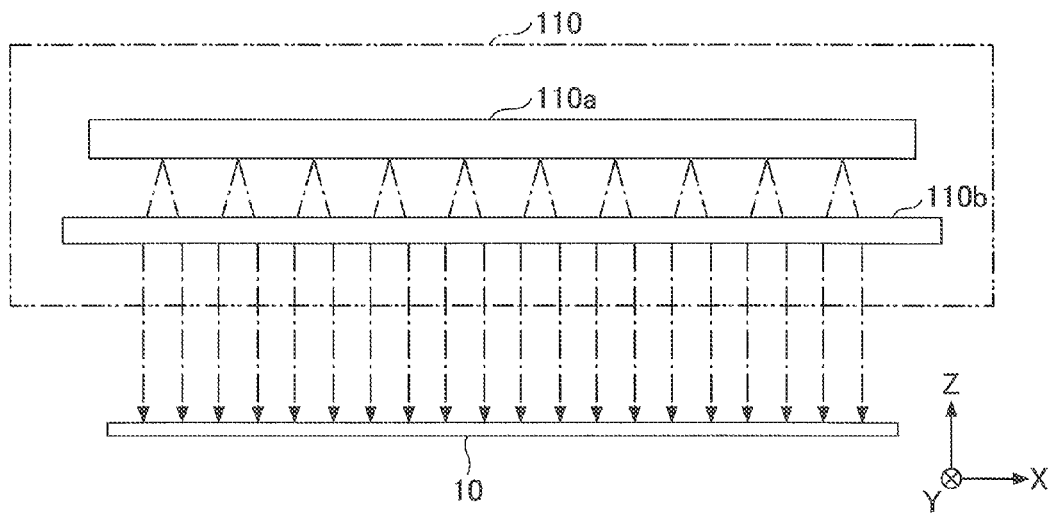
FIG. 2 is a schematic diagram illustrating a configuration of a light source unit.

As illustrated in FIG. 2 by way of example, the light source unit 110 includes a white LED array 110a as a light source, and a collimator lens array 110b. The white LED array 110a includes white LEDs arranged in the X direction. Each white LED is controlled by the control part 170 so as to be turned on or off.

The collimator lens array 110b includes collimator lenses arranged in correspondence to the white LEDs. Each collimator lens is placed in the light path of light emitted from the corresponding white LED, and collimates the emitted light, that is, makes the rays of the emitted light parallel. The light collimated by the collimator lens array 110b is emitted onto a surface of the object 10.

The light source unit 110 is thus configured to emit light linearly extending in the X direction onto the object 10.

The auxiliary light source unit 120 is an example of an additional light source unit. The auxiliary light source unit 120 has the same configuration as the light source unit 110, and emits light linearly extending in the X direction onto the object 10. The auxiliary light source unit 120 is, for example, a white LED array, a fluorescent lamp such as a cold cathode tube, or a lamp light source.

Referring back to FIG. 1, the imaging forming optical system 130 condenses the diffused reflected light of the light emitted onto the object 10, and guides the condensed light to the spectral measurement unit 150.

The imaging forming optical system 130 has an image-side telecentric characteristic, and the chief rays of light emitted from the imaging forming optical system 130 are substantially parallel to its optical axis (the Z direction). The telecentric characteristic refers to that the optical axis of an optical system and chief rays are made parallel on one side of a lens of the optical system. The image-side telecentric characteristic refers to that the optical axis and the chief rays are made parallel on the image surface side.

The spectral measurement unit 150 forms a diffraction image by diffracting reflected light condensed by the imaging forming optical system 130, and outputs an electrical signal from a line sensor that receives the diffraction image to the control part 170.

The control part 170 controls the light source unit 110, the auxiliary light source unit 120, and the spectral measurement unit 150. The control part 170 includes an operation part 171 that determines the spectral characteristic of the object 10 based on electrical signals output from the spectral measurement unit 150.

The control part 170 includes, for example, a central processing unit (CPU), a read-only memory (ROM), and a main memory. Various functions of the control part 170 are implemented by reading a program recorded in the ROM or the like into the main memory and executing the read program by the CPU. The control part 170 may be partly or entirely implemented by hardware only. Furthermore, the control part 170 may be physically configured by multiple devices.

The operation part 171 performs computation to estimate the spectral characteristic of the object 10 from electrical signals transmitted from the spectral measurement unit 150, using a conversion matrix. The method of estimating a spectral characteristic by the operation part 171 is described below.

Figure 3:
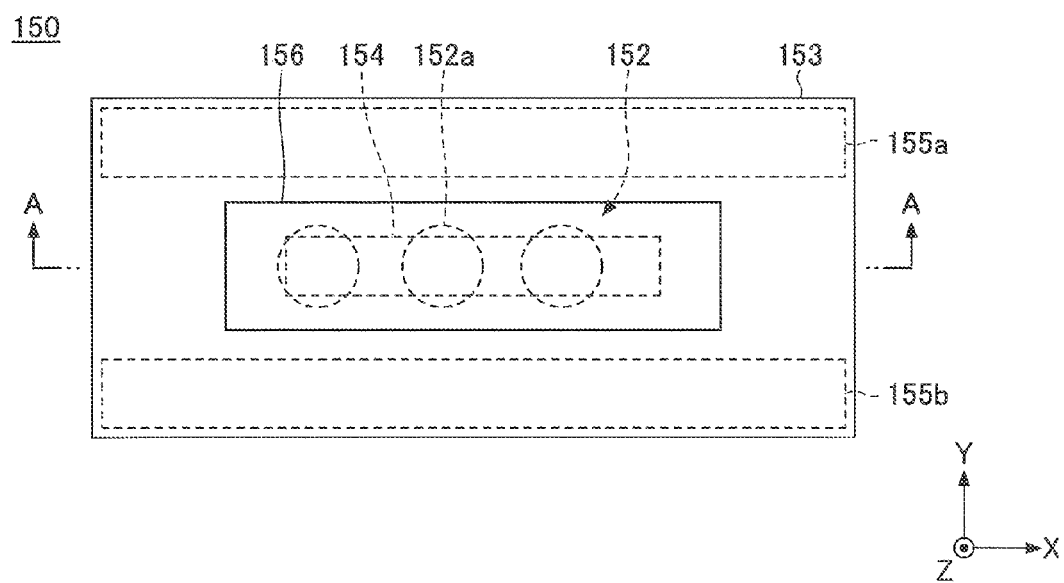
FIG. 3 is a plan view of a spectral measurement unit, schematically illustrating a configuration of the spectral measurement unit.
Figure 4:
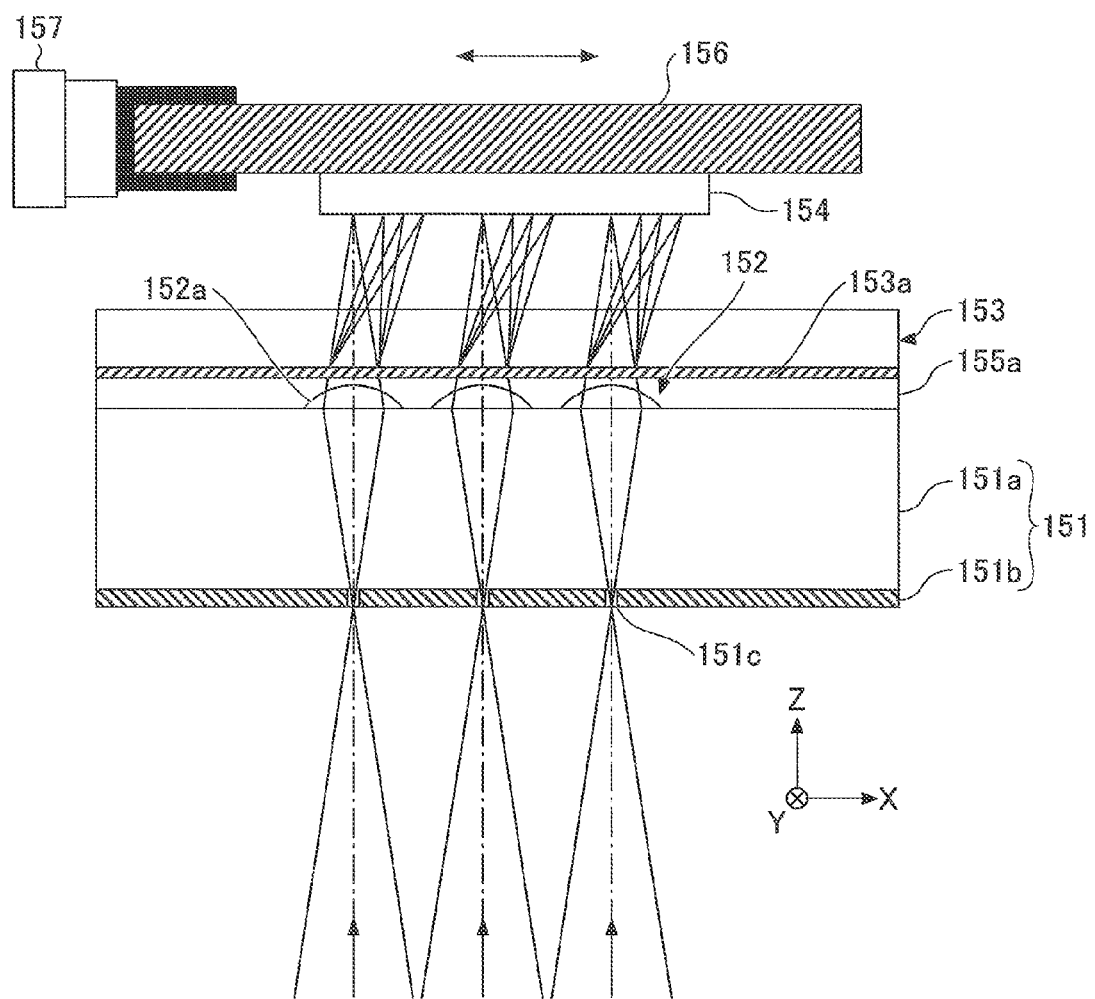
FIG. 4 is a cross-sectional view of the spectral measurement unit, schematically illustrating a configuration of the spectral measurement unit.

FIG. 3 and FIG. 4 are schematic diagrams illustrating a configuration of the spectral measurement unit 150. FIG. 3 is a plan view of the spectral measurement unit 150. FIG. 4 is a cross-sectional view of the spectral measurement unit 150 taken along a plane including line A-A of FIG. 3.

The spectral measurement unit 150 includes an aperture element 151, a microlens array 152, a diffraction element 153, a line sensor 154, a pair of spacers 155a and 155b, a board 156 to which the line sensor 154 is fixed, and a movement part 157.

The aperture element 151 is an example of a light dividing part, and is placed in the light path of reflected light condensed by the imaging forming optical system 130. The aperture element 151 includes a transparent substrate 151a and an aperture plate 151b. The transparent substrate 151a is formed of a glass material uniform in thickness. The aperture plate 151b is attached to a lower surface of the transparent substrate 151a (facing toward the imaging forming optical system 130). Multiple apertures 151c are formed and arranged at regular interval in the X direction in the aperture plate 151b.

The aperture element 151 divides reflected light from the imaging forming optical system 130 into multiple regions (light beams) by the apertures 151c. The reflected light that enters the transparent substrate 151a through the apertures 151c travels in the upward direction of FIG. 4 while being diffused inside the transparent substrate 151a.

The apertures 151c are, for example, pinholes or slits. The apertures 151c are not limited to a circle or rectangle in planar shape, and may have other planar shapes such as an ellipse. Furthermore, the aperture element 151 may alternatively be configured by forming a light blocking part by patterning a metal film or black resin on glass or transparent resin, and causing a part other than the light blocking part to transmit light.

The microlens array 152 includes microlenses 152a arranged at regular intervals in the X direction. The microlens array 152 is provided on an upper surface of the aperture element 151 (facing away from the imaging forming optical system 130) so that each microlens 152a is positioned in the light path of reflected light passing through the corresponding aperture 151c of the aperture element 151. The light passing through each aperture 151c of the aperture element 151 and traveling while being diffused inside the transparent substrate 151a is condensed by the corresponding microlens 152a.

The diffraction element 153 is an example of a dispersing part, and is fixed onto a pair of spacers 155a and 155b on the transparent substrate 151a of the aperture element 151, so as to be positioned above the microlens array 152 in FIG. 4. The diffraction element 153 forms a diffraction image corresponding to each aperture 151c by spectrally dispersing the diffused reflected light condensed by the microlens array 152 after being divided into multiple regions by the apertures 151c of the aperture element 151, and causing the dispersed light to propagate in different directions in accordance with wavelengths.

The diffraction element 153 includes, for example, a grating 153a having a sawtoothed jagged shape formed at its light entrance surface. As the diffraction element 153, for example, a transparent substrate on which a sawtoothed shape is formed at regular intervals is preferable because of its capability to strengthen positive first-order (+1) diffracted light. The sawtoothed shape may be replaced with other shapes such as a stepped shape.

The line sensor 154 is an example of a light receiving part. Examples of the line sensor 154 include metal-oxide semiconductor (MOS) devices, complementary MOS (CMOS) devices, charge-coupled device (CCD)s, contact image sensor (CIS)s, and photo diode array (PDA)s.

Figure 5:
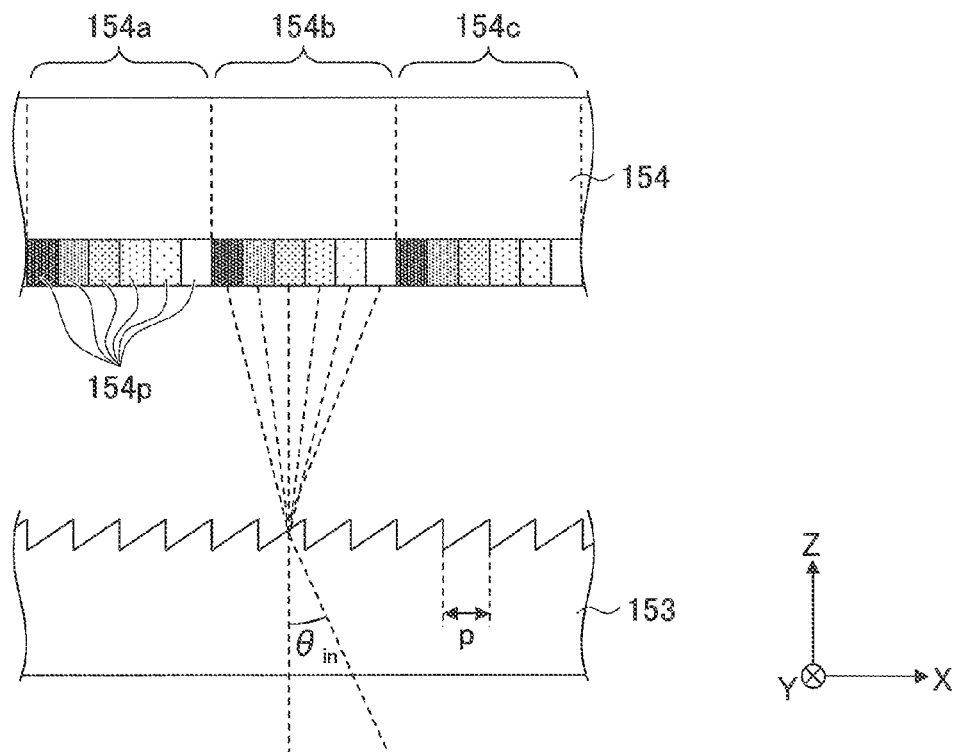
FIG. 5 is a diagram illustrating the positional relationship between a diffraction element and a line sensor.

Referring to FIG. 5, multiple pixels 154p are arranged in a single line in the X direction on a light-receiving surface of the line sensor 154. The line sensor 154 is a spectral sensor array of multiple spectral sensors including a first spectral sensor 154a, a second spectral sensor 154b, and a third spectral sensor 154c. Each of the spectral sensors including the first through third spectral sensors 154a through 154c includes N pixels 154p arranged in a single line, where N is an integer greater than one. The N pixels 154p receive respective light beams of different spectral characteristics and output electrical signals. The pixels 154p of the line sensor 154 may be arranged in two or more lines.

The line sensor 154, together with the board 156, is positioned by the movement part 157 so that light from each aperture 151c of the aperture element 151 is diffracted by the diffraction element 153 to enter the N pixels 154p of a corresponding one of the spectral sensors.

Here, letting the interval between sawtoothed shapes of the diffraction element 153 be p, light of a wavelength λ that enters the diffraction element 153 at an angle θin is diffracted to an angle θm expressed by:

$$\sin\theta_m = m\frac{\lambda}{p} + \sin\theta_{in}. \tag{1}$$

In Eq. (1), m is an order of diffraction by the diffraction element 153, and may be either a positive or a negative integer value.

Because of the wavelength dependence of the diffraction angle θm expressed by Eq. (1), lights having different spectral characteristics enter the N pixels 154p of each spectral sensor of the line sensor 154.

Figure 6:
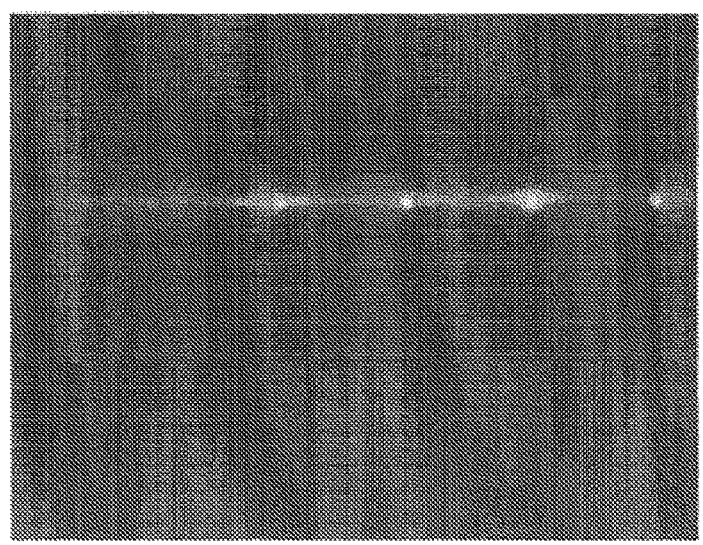
FIG. 6 is a photograph illustrating light incident on a line sensor viewed from the incidence surface side.

When the diffraction element 153 diffracts light in a direction in which the pixels 154p of the line sensor 154 are arranged (the X direction), zero-order light, a second-order diffraction image, and a diffraction image transmitted through an adjacent aperture may be superposed one over another on the line sensor 154. In such a case, crosstalk occurs as illustrated in FIG. 6, thus making it difficult to acquire an accurate spectral characteristic.

Figure 7:
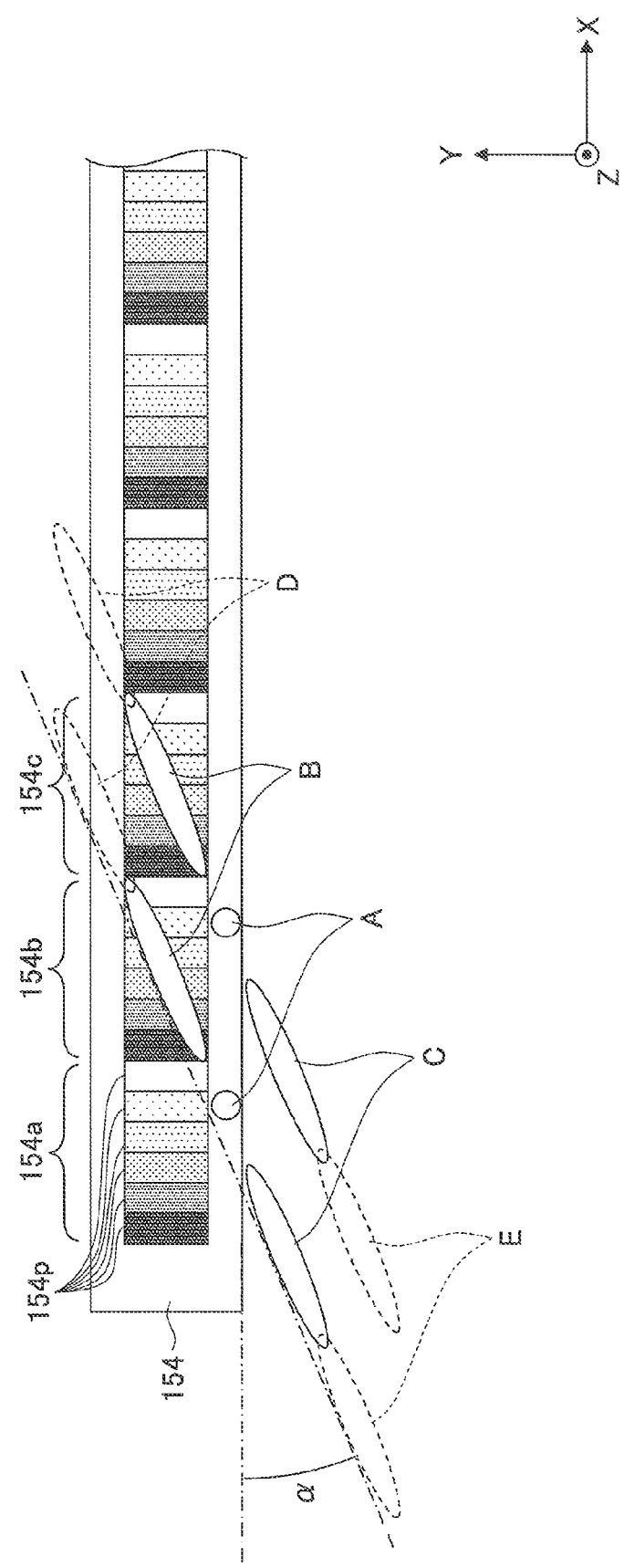
FIG. 7 is a diagram illustrating the relationship between a line sensor and diffraction images.

Therefore, for example, by rotating the diffraction element 153 in the X-Y plane or suitably setting the tooth angle of the diffraction element 153, a predetermined angle a is formed between the direction of diffraction of diffracted light and the direction in which the pixels 154p of the line sensor 154 are arranged as illustrated in FIG. 7.

Figure 8:
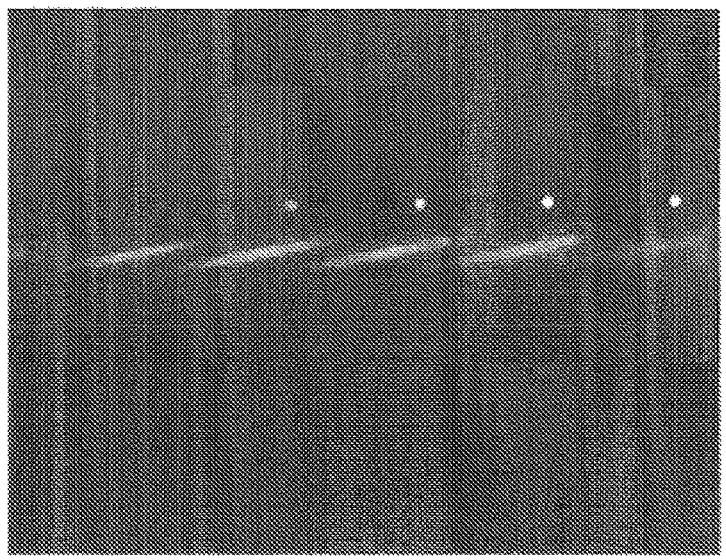
FIG. 8 is a photograph illustrating light incident on a line sensor viewed from the incidence surface side.

By this configuration, only a positive first-order diffraction image B of each aperture 151c of the aperture element 151 is formed on the line sensor 154. Unnecessary diffraction images such as non-diffraction images A (zero-order diffraction images), negative first-order diffraction images C, positive second-order diffraction images D, and negative second-order diffraction images E are formed at positions away from the pixels 154p of the line sensor 154. Accordingly, it is possible for the spectral characteristic acquisition apparatus 100 to determine the spectral characteristic of the object 10 from the positive diffraction images B without the crosstalk of diffraction images as illustrated in FIG. 8. In the following description, the positive diffraction image or images B may be simply referred to as "diffraction image or images."

As described above, the line sensor 154 is a multi-band spectral sensor including an array of spectral sensors including the first through third spectral sensors 154a through 154c, where a group of N arranged pixels 154p forms each individual spectral sensor.

The resolution of a multi-band spectral sensor for a measured spectral characteristic is improved as the number of pixels N of each individual spectral sensor increases. However, the number of pixels provided in the line sensor 154 is limited, and the number of individual spectral sensors that may be arrayed is decreased by an increase in the number of pixels per individual spectral sensor. Therefore, preferably, the spectral characteristic acquisition apparatus 100 is configured to execute a process of estimating a spectral distribution (a spectral estimation process) using an estimation technique such as the Wiener estimation with a minimum number of pixels per individual spectral sensor. Many techniques have been proposed with respect to the spectral estimation process, of which details are described in, for example, Miyake Y.; "Analysis and Evaluation of Digital Color Images," University of Tokyo Press, pp. 154-157 (2000).

By way of example, a technique of estimating a spectral distribution from outputs vi of a single spectral sensor is illustrated below. A row vector r that stores the spectral reflectance values of wavelength bands (for example, 31 values at intervals of 10 nm between 400 nm and 700 nm) is expressed from a row vector v that stores the signal outputs vi (i=1 to N) from N pixels forming a single spectral sensor and a transformation matrix G by:

$$r = Gv. \tag{2}$$

As shown in Eq. (3), Eq. (4) and Eq. (5), the transformation matrix G is determined from a matrix R that stores in advance the spectral distributions of a number of (n) samples whose spectral distributions are known and a matrix V that stores row vectors v at the time of measuring the samples with the spectral characteristic acquisition apparatus 100 by minimizing the squared norm of the error, $\|\bullet\|^2$, using the method of least squares.

$$R = [r1, r2, \ldots, rn]. \tag{3}$$

$$V = [v1, v2, \ldots, vn]. \tag{4}$$

$$e = \|R - GV\|^2 \rightarrow \min. \tag{5}$$

The regression transformation matrix G of a regression equation from V to R, where V is an explanatory variable and R is a response variable, is calculated using a Moore-Penrose generalized inverse matrix that gives the least square and minimal norm solution of the matrix V as follows:

$$G = RV^T(VV^T)^{-1}. \quad (6)$$

In Eq. (6), a superscript "T" expresses the transposition of a matrix and a superscript "−1" expresses an inverse matrix. By storing G determined in Eq. (6), the spectral distribution r of any object 10 is estimated by determining the product of the transformation matrix G and the signal output v at the time of an actual measurement.

The operation part 171 of the spectral characteristic acquisition apparatus 100 determines the spectral characteristic of the object 10 from the electrical signal output from each pixel of each spectral sensor of the line sensor 154 by the above-described estimation using the transformation matrix G as described above.

Figure 9:
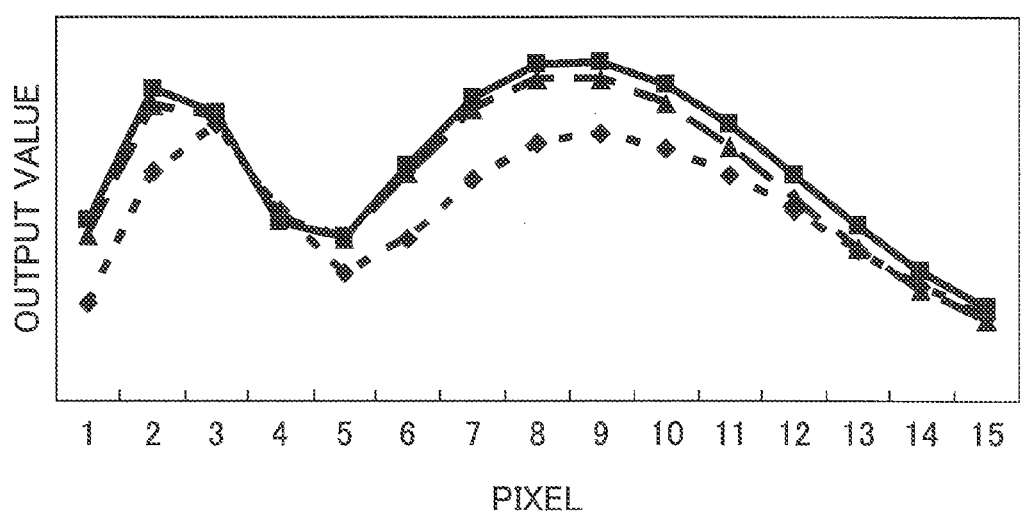
FIG. 9 is a graph illustrating outputs of spectral sensors.

Here, if the position at which a diffraction image is received in the individual spectral sensor ("diffraction image receiving position") differs among the individual spectral sensors, the output values of the pixels of each spectral sensor may differ from spectral sensor to spectral sensor as illustrated in FIG. 9, even if the object of measurement is the same. FIG. 9 is a graph illustrating the output values of three spectral sensors that receive respective diffraction images from the same object of measurement at different positions, where each spectral sensor is formed of 15 pixels.

If the diffraction image receiving position differs among spectral sensors as illustrated in FIG. 9, the wavelength bands of the diffraction image received by the pixels of each spectral sensor differ from spectral sensor to spectral sensor, so that the output values of the spectral sensors vary, even when the object of measurement is the same.

Therefore, according to the spectral characteristic acquisition apparatus 100 of this embodiment, the line sensor 154 is moved and positioned in the X-Y plane by the movement part 157 so that the diffraction image receiving position is substantially the same among the individual spectral sensors of the line sensor 154. By way of example, in the cross-sectional view of FIG. 4, each of the interval of the apertures 151c in the X direction and the interval of the microlenses 152a in the X direction is a positive integral multiple of the pixel width of the line sensor 154 in the X direction. Accordingly, the line sensor 154 is positioned so that the diffraction image receiving position is substantially the same among the individual spectral sensors by being moved in the X direction or a direction opposite to the X direction as indicated by a double-headed arrow in FIG. 4.

Figure 10:
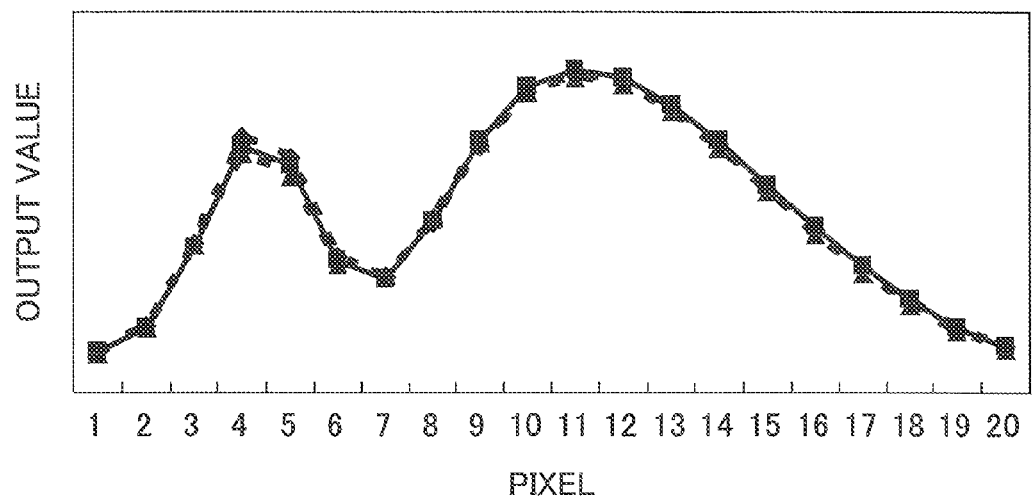
FIG. 10 is a graph illustrating outputs of spectral sensors.

The line sensor 154 is moved by the movement part 157 to be positioned so that the diffraction image receiving position is substantially the same among the individual spectral sensors. As a result, the output values of the pixels of the individual spectral sensors match as illustrated in FIG. 10. FIG. 10 is a graph illustrating the output values of three spectral sensors that are positioned so that the diffraction image receiving position is substantially the same among the spectral sensors, where each spectral sensor is formed of 20 pixels.

As illustrated in FIG. 10, when the diffraction image receiving position is substantially the same among spectral sensors, the spectral sensors are equalized in the wavelength bands of a diffraction image received by the pixels of each spectral sensor, so that the output values of the pixels are the same among the spectral sensors, if the object of measurement is the same.

Accordingly, it is possible for the spectral characteristic acquisition apparatus 100 to determine the spectral characteristic of the object 10 with high accuracy without variations based on the outputs of the individual spectral sensors of the line sensor 154. Furthermore, in the case of measuring the spectral characteristic over a wide area of the object 10 by averaging the output values of the individual spectral sensors of the line sensor 154 as well, it is possible to determine the spectral characteristic with accuracy because of the absence of variations in the outputs of the individual spectral sensors.

Figure 11:
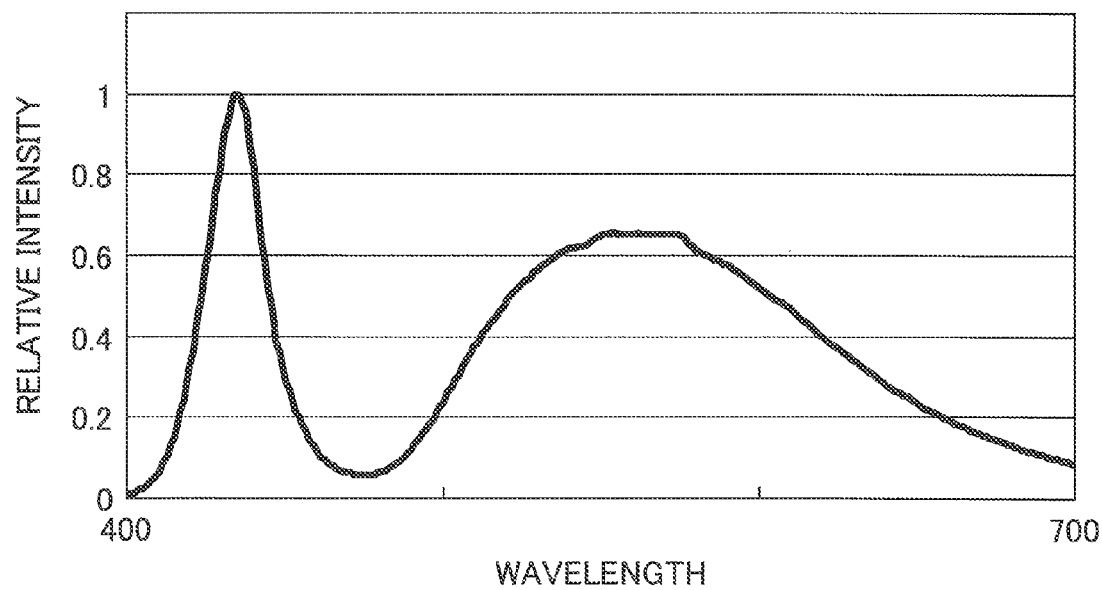
FIG. 11 is a graph illustrating a wavelength distribution of a light source unit.

In order to equalize the diffraction image receiving positions in the individual spectral sensors, the light source of the light source unit 110 may have a peak of emission intensity at specific wavelengths as illustrated in FIG. 11. FIG. 11 is a graph illustrating the wavelength distribution of a white LED provided in the light source unit 110 according to this embodiment, where the emission intensity peaks at wavelengths of 400 nm to 450 nm and at wavelengths of 500 nm to 600 nm.

The light source peaks at specific wavelengths, so that corresponding peaks appear in the output value of each spectral sensor of the line sensor 154. Accordingly, by the movement part 157 adjusting the position of the line sensor 154 based on pixel positions at which such peaks appear, it is possible to easily match the diffraction image receiving positions in the individual spectral sensors. In addition to the white LED, examples of light sources whose emission intensity peaks at specific wavelengths include, for example, a blue LED and a red LED.

The light source of the light source unit 110 may have constant strength in the substantially entire wavelength range of visible light. Therefore, a light source that has constant strength irrespective of wavelength, such as a high color rendering index LED, a Xenon light source, or a plasma light source may be provided in the light source unit 110, and, for example, a white LED or the like that has a peak of emission intensity at specific wavelengths as illustrated in FIG. 11 may be provided in the auxiliary light source unit 120. It is possible to determine the spectral characteristic with high accuracy with the light emitted from the light source unit 110 after adjusting the position of the line sensor 154 with the light emitted from the auxiliary light source unit 120.

When the light source of the light source unit 110 employs a white LED or the like whose emission intensity peaks at specific wavelengths, it is possible to omit the auxiliary light source unit 120. Alternatively, each of the light source unit 110 and the auxiliary light source unit 120 may include a light source that peaks at specific wavelengths. In this case, it is possible to adjust the position of the line sensor 154 with more accuracy.

As described above, according to the spectral characteristic acquisition apparatus 100 of the first embodiment, measurement variations in the individual spectral sensors of the line sensor 154 are reduced, so that it is possible to determine the spectral characteristic of the object 10 with high accuracy.

[Second Embodiment]

Figure 12:
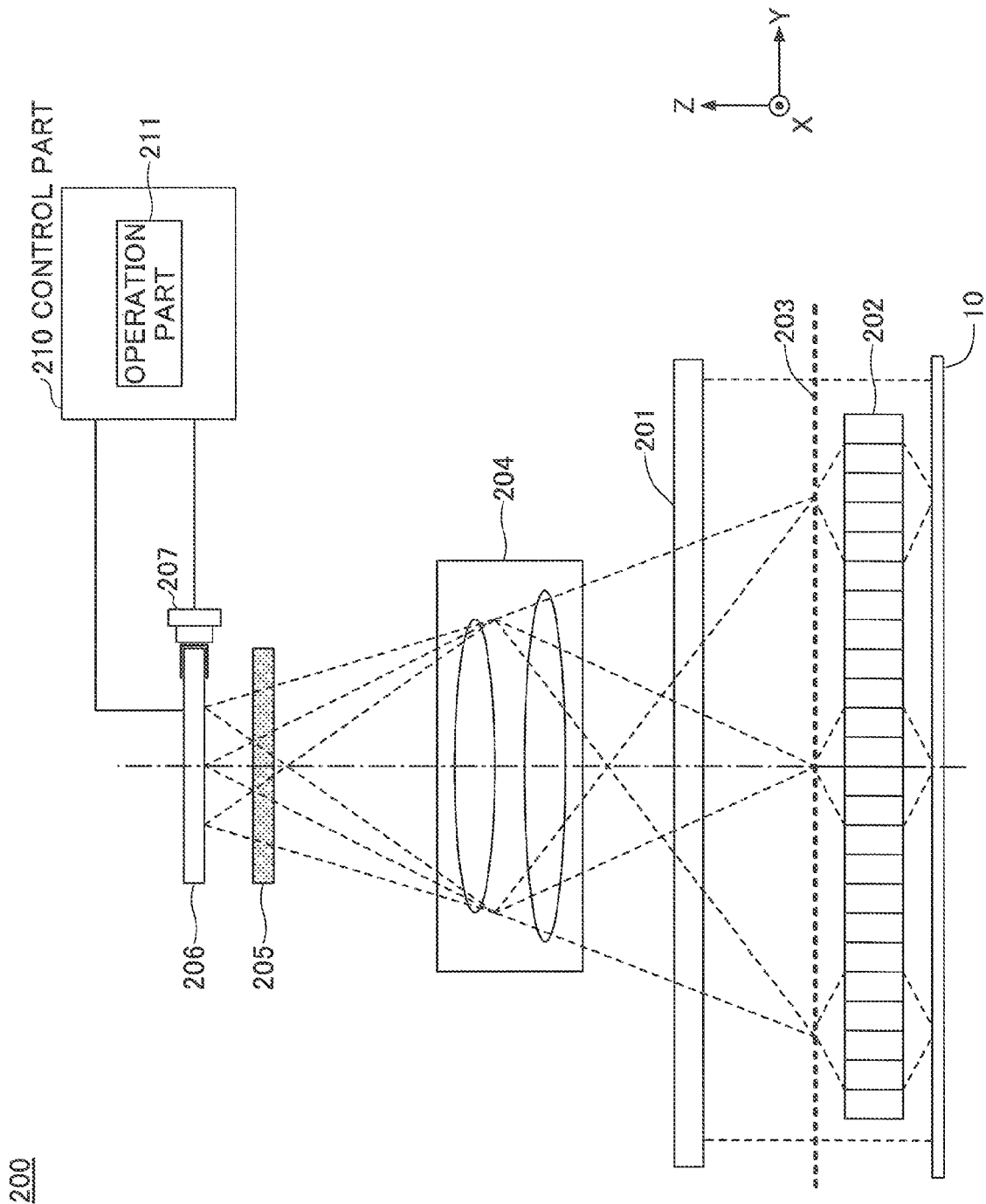
FIG. 12 is a schematic diagram illustrating a configuration of a spectral characteristic acquisition apparatus according to a second embodiment.

Next, a description is given, with reference to FIG. 12, of a second embodiment. A description of the same elements as those of the above-described embodiment is omitted.

FIG. 12 is a schematic diagram illustrating a configuration of a spectral characteristic acquisition apparatus 200 according to the second embodiment.

Referring to FIG. 12, the spectral characteristic acquisition apparatus 200 includes a line illumination light source 201, a first imaging forming optical system 202, an aperture array 203, a second imaging forming optical system 204, a diffraction element 205, a line sensor 206, a movement part 207, and a control part 210. In FIG. 12, broken lines schematically illustrate a typical light path after light emitted onto the object 10 is reflected and diffused.

The line illumination light source 201 is an example of a light emitting part, and emits light onto an area linearly extending in the widthwise direction of the object 10 (the X direction). The line illumination light source 201 is, for example, a white LED array. The line illumination light source 201 is not limited to white LEDs, and may alternatively be, for example, a fluorescent lamp such as a cold cathode tube, or a lamp light source.

In order to facilitate the positioning of the line sensor 206, the line illumination light source 201 may have a peak of emission strength at specific wavelengths. Furthermore, in addition to the line illumination light source 201, an auxiliary line illumination light source having a peak of emission intensity at specific wavelengths may be provided as an additional light emitting part.

A collimator lens that has the function of causing light emitted from the line illumination light source 201 to linearly illuminate the object 10 by collimating (making substantially parallel) or condensing the emitted light may be provided in the light path from the line illumination light source 201 to the object 10.

The first imaging forming optical system 202 focuses the light emitted to the object 10 and diffused and reflected in the Z direction onto the aperture parts of the aperture array 203. The first imaging forming optical system 202 does not necessarily have to accurately focus the diffused reflected light onto the aperture parts of the aperture array 203. The light may be in a defocused state or the first imaging forming optical system 202 may be an infinite system.

Examples of the first imaging forming optical system 202 includes a condensing lens array having multiple lenses arranged in the X direction, a gradient index lens array such as a SELFOC (registered trademark) lens array, a microlens array, and an imaging forming optical system formed of mirrors.

The aperture array 203 is an example of a light dividing part. For example, the aperture array 203 includes multiple aperture parts formed in a single line. The part of the aperture array 203 other than the aperture parts serves as a light blocking part that blocks light. The aperture array 203 divides reflected light from the object 10 into multiple regions (light beams) with the aperture parts.

The aperture array 203 is, for example, a pinhole array or a slit array. The aperture array 203 may be configured by forming apertures in a metal or black resin material. The aperture array 203 may alternatively be configured by forming a light blocking part by patterning a metal film or black resin on glass or transparent resin, and causing a part other than the light blocking part to serve as aperture parts to transmit light. The aperture parts may be a circle, rectangle, or ellipse in planar shape, and may have other planar shapes as desired.

The diffused reflected light from the object 10 is divided into multiple regions by the aperture parts of the aperture array 203, and unnecessary portions of the light are blocked. As a result, the light of a focal plane passing through the aperture parts alone is detected, and entry of reflected light from adjacent regions is prevented.

The second imaging forming optical system 204 is, for example, formed of multiple lenses, and focuses the reflected light passing through the aperture array 203 onto a light-receiving surface of the line sensor 206 through the diffraction element 205. For example, lenses used for common scanner optical systems or lenses industrially used for line sensors may be used as the second imaging forming optical system 204. Furthermore, the second imaging forming optical system 204 preferably has an image-side telecentric characteristic because having an image-side telecentric characteristic facilitates the positioning of the line sensor 206.

The diffraction element 205 is an example of a dispersing part, and forms a diffraction image by diffracting the reflected light of the light emitted onto the object 10. To be more specific, the diffraction element 205 spectrally disperses the diffused reflected light condensed by the second imaging forming optical system 204 after being divided into regions by the aperture parts of the aperture array 203 and propagates the dispersed light in different directions in accordance with wavelengths, so as to form a diffraction image corresponding to each aperture part. The diffraction element 205 is, for example, a prism, a transmission diffraction grating, or their combination.

The line sensor 206 is an example of a light receiving part, and is a multiband spectral sensor array in which multiple spectral sensors each formed of multiple pixels are provided side by side on the light-receiving surface of the line sensor 206. The line sensor 206 acquires the intensity of light of each wavelength band from each diffraction image made incident on the light-receiving surface through the diffraction element 205, and converts the acquired intensity of light into an electrical signal. The electrical signal generated by the line sensor 206 is transmitted to the control part 210.

Examples of the line sensor 206 include MOS devices, CMOS devices, CCDs, CISs, and PDAs.

The movement part 207 adjusts the diffraction image receiving position in each spectral sensor by moving the line sensor 206 in directions parallel to the light-receiving surface of the line sensor 206.

The control part 210 controls the line sensor 206 and the movement part 207. The control part 201 includes an operation part 211 that determines the spectral characteristic of the object 10 based on electrical signals output from the line sensor 206.

The control part 210 includes, for example, a CPU, a ROM, and a main memory. Various functions of the control part 210 are implemented by reading a program recorded in the ROM or the like into the main memory and executing the read program by the CPU. The control part 210 may be partly or entirely implemented by hardware only. Furthermore, the control part 210 may be physically configured by multiple devices.

The operation part 211 estimates the spectral characteristic of the object 10 from electrical signals transmitted from the line sensor 206 using a conversion matrix in the same manner as in the first embodiment.

The optical system illustrated by way of the example in FIG. 12 may be, for example, a so-called 45/0 optical system where illuminating light emitted from the line illumination light source 201 is made incident on the object 10 substantially obliquely at 45 degrees and the line sensor 206 receives light reflected from the object 10 in the Z direction and diffused. Alternatively, the optical system illustrated in FIG. 12 may be a so-called 0/45 optical system where illuminating light emitted from the light illumination light source 201 is made incident on the object 10 at a right angle and the line sensor 206 receives light reflected from the object 10 in a direction of 45 degrees and diffused.

According to the spectral characteristic acquisition apparatus 200 of the second embodiment, the line sensor 206 is positioned by the movement part 207 so that the diffraction image receiving position is substantially the same in each of the spectral sensors of the line sensor 206. Therefore, according to the spectral characteristic acquisition apparatus 200, measurement variations in the individual spectral sensors of the line sensor 206 are reduced, so that it is possible to determine the spectral characteristic of the object 10 with high accuracy.

[Third Embodiment]

In a third embodiment, a description is given of an image evaluation apparatus 300 that includes the spectral characteristic acquisition apparatus 200. In the third embodiment, the same elements as those of the above-described embodiments are referred to by the same reference numerals, and their description is omitted.

Figure 13:
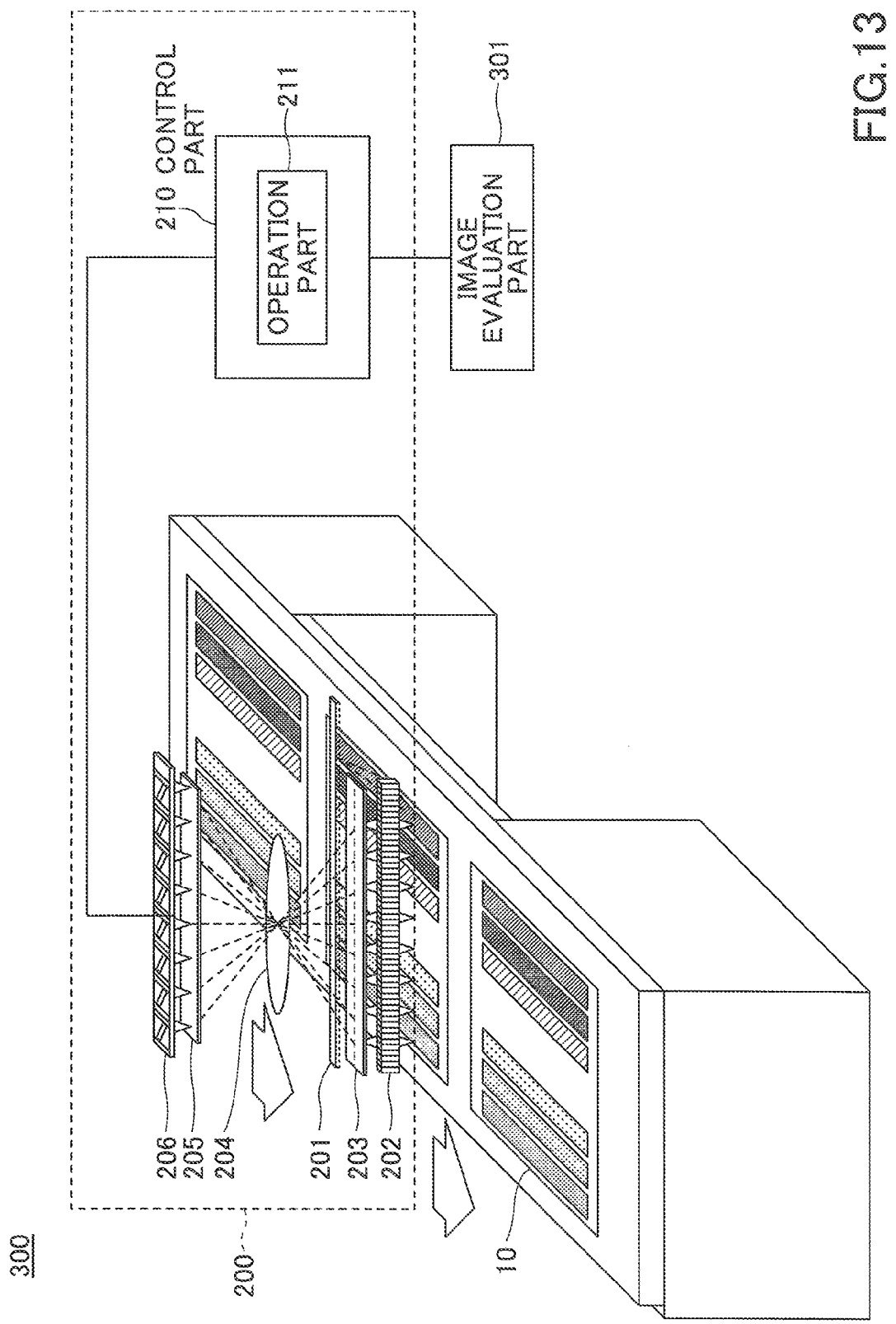
FIG. 13 is a schematic diagram illustrating a configuration of an image evaluation apparatus according to a third embodiment.

FIG. 13 is a schematic diagram illustrating a configuration of the image evaluation apparatus 300 according to the third embodiment. Referring to FIG. 13, the image evaluation apparatus 300 includes the spectral characteristic acquisition apparatus 200 according to the second embodiment, an image evaluation part 301, and a conveyance part (not illustrated) that conveys the object 10.

The spectral characteristic acquisition apparatus 200 includes the line illumination light source 201, the first imaging forming optical system 202, the aperture array 203, the second imaging forming optical system 204, the diffraction element 205, the line sensor 206, and the control part 210.

The image evaluation apparatus 300 evaluates an image formed on the object 10 by, for example, an electrophotographic image forming apparatus over the entire width of the image. In the case illustrated in FIG. 13, the image evaluation apparatus 300 includes the single spectral characteristic acquisition apparatus 200. Alternatively, for example, multiple spectral characteristic acquisition apparatuses 200 may be provided side by side in the widthwise directions of the object 10, which is perpendicular to the direction indicated by arrows in FIG. 13.

The image evaluation part 301 includes, for example, a CPU, a ROM, and a main memory. Various functions of the image evaluation part 301 are implemented by reading a program recorded in the ROM or the like into the main memory and executing the read program by the CPU. The image evaluation part 301 may be partly or entirely implemented by hardware only. Furthermore, the image evaluation part 301 may be physically configured by multiple devices.

The conveyance part conveys the object 10 in the direction indicated by arrows in FIG. 13. In the case illustrated in FIG. 13, the image evaluation apparatus 300 is configured so that the conveyance part moves the object 10. Alternatively, the image evaluation apparatus 300 may be configured to move relative to the object 10. For example, conveyance rollers and a conveyor belt may be used as the conveyance part. The image evaluation part 301 may calculate spectral image data over the entire surface of a part of the object 10 where an image is formed based on known velocity information or velocity information from an encoder sensor attached to the conveyance part.

Preferably, the image evaluation apparatus 300 is configured so that a color measurement result acquired by the line sensor 206 may be compared with a master image, and a difference from the master image may be extracted and displayed in the image evaluation part 301. As a result, it is possible for an operator to make a comparison with the master image with ease. A digital master image may be externally input as the master image. Alternatively, the measurement result of any object 10 measured by the image evaluation apparatus 300 may be set as the master image.

As described above, according to the third embodiment, by configuring the image evaluation apparatus 300 using the spectral characteristic acquisition apparatus 200, it is possible to implement the image evaluation apparatus 300 capable of performing high-speed evaluation of the colors of an image or the like formed on the conveyed object 10.

In place of the spectral characteristic acquisition apparatus 200 according to the second embodiment, the spectral characteristic acquisition apparatus 100 according to the first embodiment may be provided in the image evaluation apparatus 300.

[Fourth Embodiment]

In a fourth embodiment, a description is given of an image forming apparatus 400 that includes the image evaluation apparatus 300 according to the third embodiment. In the fourth embodiment, the same elements as those of the above-described embodiments are referred to by the same reference numerals, and their description is omitted.

Figure 14:
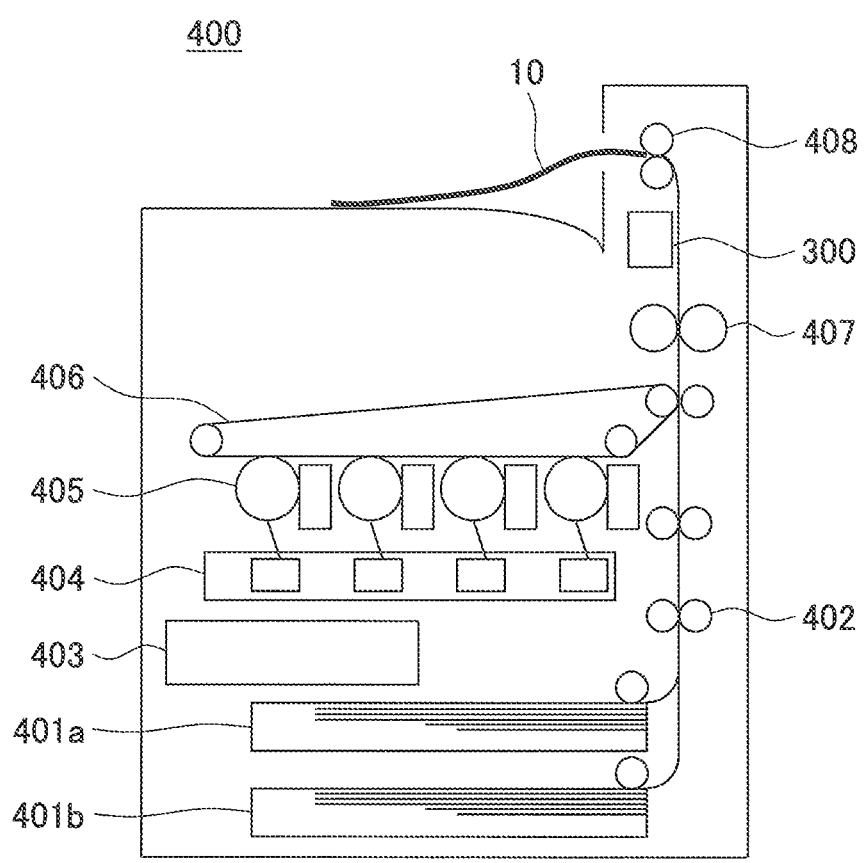
FIG. 14 is a schematic diagram illustrating a configuration of an image forming apparatus according to a fourth embodiment.

FIG. 14 is a schematic diagram illustrating the image forming apparatus 400 according to the fourth embodiment. Referring to FIG. 14, the image forming apparatus 400 includes the image evaluation apparatus 300 according to the third embodiment, a paper feeding cassette 401a, a paper feeding cassette 401b, paper feeding rollers 402, a controller 403, a scanning optical system 404, a photosensitive body 405, an intermediate transfer body 406, fixing rollers 407, and paper discharge rollers 408. The object 10 is a recording medium such as paper.

According to the image forming apparatus 400, the object 10 is conveyed from the paper feeding cassette 401a or 401b by a guide (not illustrated) and paper feeding rollers 402. Furthermore, the photosensitive body 405 is exposed to light by the scanning optical system 404 based on image data, so that an electrostatic latent image is formed on a surface of the photosensitive body 405. The electrostatic latent image is developed by adding color materials. The image developed on the surface of the photosensitive body 405 is transferred onto the intermediate transfer body 406, and is thereafter secondarily transferred onto the object 10 from the intermediate transfer body 406. The image transferred onto the object 10 is fixed by the fixing rollers 407, and the object 10 on which the image is formed is discharged by the paper discharge rollers 408. The image evaluation apparatus 300 is provided on the downstream side of the fixing rollers 307 in a path in which the object 10 is conveyed.

According to the image forming apparatus 400 of the fourth embodiment, by including the image evaluation apparatus 300 according to the third embodiment, it is possible to obtain color information in a surface of a recording medium in synchronization with the conveyance of the recording medium. Furthermore, for example, in the case where the image forming apparatus 400 electrophotographically forms an image, it is possible to reduce the color unevenness of an image formed on the recording medium by an adjustment part controlling the output of a light source of a writing scanning optical system and adjusting conditions for image formation, such as gamma correction before printing, based on the evaluation results of the obtained image colors.

Furthermore, for example, in the case where the image forming apparatus 400 forms an image by inkjet printing, it is possible to reduce the color unevenness of an image formed on the recording medium by directly controlling the amount of ink ejection based on head positions.

Furthermore, when there is a color chart, it is possible to evaluate a spectral characteristic suitable to the color chart because it is possible to two-dimensionally acquire spectral characteristics different in spatial resolution over the entire surface of an image with the image evaluation apparatus 300 according to the third embodiment. Furthermore, when there is no color chart, it is possible to evaluate a spectral characteristic suitable for any position in any image of a user. By adjusting conditions for image formation based on the evaluation of either case, it is possible to implement the image forming apparatus 400 improved in color stability and color reproducibility.

The above-described spectral characteristic acquisition apparatuses are not limited to the above-described embodiments, and may also be provided in various apparatuses other than image evaluation apparatuses and image forming apparatuses. For example, the spectral characteristic acquisition apparatuses may be provided in, for example, a checking apparatus that checks the credibility of bills or credit cards.

A description is given above of spectral characteristic acquisition apparatuses, an image evaluation apparatus, and an image forming apparatus according to the embodiments. The present invention, however, is not limited to the specifically disclosed embodiments, and variations and modifications may be made without departing from the scope of the present invention. All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention.

What is claimed is:

1. A spectral characteristic acquisition apparatus, comprising:
   a light emitting part configured to emit light onto an object;
   a light dividing part configured to divide the light reflected from the object into a plurality of light beams by a plurality of aperture parts of the light dividing part;
   a dispersing part configured to form a plurality of diffraction images corresponding to the plurality of aperture parts by spectrally dispersing the light beams;
   a light receiving part including an array of spectral sensors that receive the diffraction images and convert the received diffraction images into electrical signals;
   a movement part configured to move the light receiving part relative to the dispersing part in a direction parallel to a light receiving surface of the light receiving part, so that the spectral sensors receive the diffraction images at a substantially same position on respective light receiving surfaces; and
   an operation part configured to compute a spectral characteristic of the object based on the electrical signals.

2. The spectral characteristic acquisition apparatus as claimed in claim 1, wherein the light emitting part has a peak of emission intensity at a specific wavelength.

3. The spectral characteristic acquisition apparatus as claimed in claim 1, further comprising:
   an additional light emitting part that has a peak of emission intensity at a specific wavelength.

4. An image evaluation apparatus, comprising:
   the spectral characteristic acquisition apparatus as set forth in claim 1; and
   an image evaluation part configured to evaluate an image on the object based on the spectral characteristic of the object determined by the spectral characteristic acquisition apparatus.

5. An image forming apparatus, comprising:
   an image fowling part configured to form an image on an object; and
   an image evaluation apparatus configured to evaluate the image on the object,
   wherein the image evaluation apparatus includes
   the spectral characteristic acquisition apparatus as set forth in claim 1; and
   an image evaluation part configured to evaluate the image on the object based on the spectral characteristic of the object determined by the spectral characteristic acquisition apparatus.

\* \* \* \* \*